June 19, 1923.  1,459,213

G. KEINATH

ELECTRIC MEASURING APPLIANCE

Filed Nov. 2, 1920

Georg Keinath,
Inventor,
By Knight Bro.
Attorneys

Patented June 19, 1923.

1,459,213

UNITED STATES PATENT OFFICE.

GEORG KEINATH, OF BERLIN-CHARLOTTENBURG, GERMANY, ASSIGNOR TO SIEMENS & HALSKE AKTIENGESELLSCHAFT, OF SIEMENSTADT, NEAR BERLIN, GERMANY, A GERMAN CORPORATION.

ELECTRIC MEASURING APPLIANCE.

Application filed November 2, 1920. Serial No. 421,395.

*To all whom it may concern:*

Be it known that I, GEORG KEINATH, a citizen of the German Empire, residing at Berlin-Charlottenburg, Germany, have invented certain new and useful Improvements in Electric Measuring Appliances (for which I have filed applications in Germany, January 17th, 1918, Patent No. 343,811, granted September 5th, 1921; Switzerland, February 1st, 1919, Patent No. 84,652, granted December 31st, 1919; Italy, February 11th, 1919, Patent No. 174,519, granted February 19th, 1921; Sweden, February 4th, 1919, Patent No. 45,483, granted May 22nd, 1919; Norway, February 7th, 1919, Patent No. 31,800, granted January 3rd, 1921; Austria, January 10th, 1919, Patent No. 81,944, granted May 27th, 1920; and Czechoslovakia, May 20th, 1920, Patent No. 4718, granted February 24th, 1921), of which the following is a specification.

My invention refers to electric measuring appliances and more especially to appliances for measuring very high currents. Its particular object is an appliance of this kind which is simpler in construction and yet more effective than those hitherto in use.

The construction of measuring appliances for measuring very high currents offers considerable difficulties in the case of currents above 40,000 amperes. As in such cases a current carrying bar surrounded by an annular iron core with the secondary winding arranged thereon cannot be used, it has been proposed to construct such appliances without any primary conductors, their iron body consisting of straight shanks carrying the windings and of yokes which are free of windings, one of the yokes being adapted to be unfolded so as to allow the introduction of the conductor carrying the current to be measured. An appliance of this kind however consisting either of one shank and three yokes or two shanks and two yokes forms a rigid shape which is unvariable as regards its dimensions and can not be adapted to local requirements. Moreover its iron core owing to its necessarily great sectional area has a very considerable weight, and in the higher measuring ranges such appliances present very high no-load voltages.

In accordance with the present invention I propose to overcome these disadvantages by forming a chain of iron cores suitably linked together, each link carrying individually a portion of the secondary winding.

Figure 1:
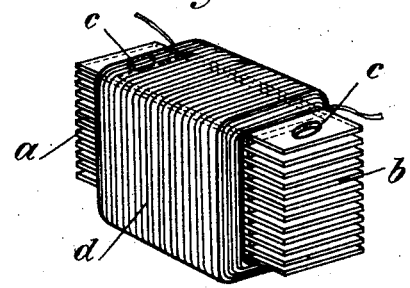
Figure 2:
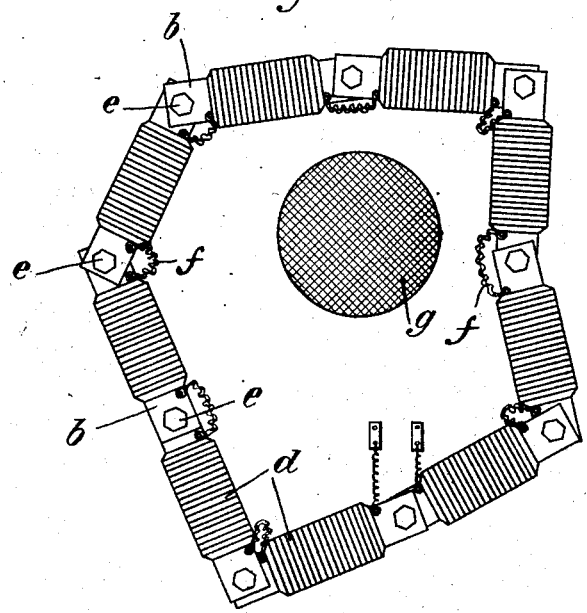

In the drawings affixed to this specification and forming part thereof the preferred form of a measuring appliance according to the present invention is illustrated, Fig. 1 being a perspective view of an individual link, while Fig. 2 is a plan view of the appliance as a whole surrounding a current-carrying conductor.

Referring to the drawings, *a* is the iron body of each link, said body being formed in the usual manner of a pack of individual laminæ, alternately protruding at opposite ends of the link, so that the ends of these links may be jointed together as shown and pivotally held together by means of bolts *e*, passing through holes *c*. *d* is the secondary winding covering each plate pack so as to leave the ends of the plates free. In consequence of this arrangement each link shows at its ends only one-half of the whole number of laminæ or plates forming the core, which number is complemented by the end plates of the adjoining member to the full cross-sectional area of the core. By tightening the nuts of the screw bolts the ends of the plates are pressed against each other and a good contact is obtained. The windings *d* of the individual members are connected in series by aid of flexible conductors *f* consisting for instance of corrugated bands, so that the entire secondary winding is substantially uniformly distributed over the entire chain and thus over the entire transformer core.

In using the appliance described the position of the primary conductor *g* relatively to the individual chain links is of no importance, inasmuch as the ratio of transformation remains almost the same over the whole range and the vectors of the primary and secondary currents almost always extend in a straight line owing to the above mentioned uniform distribution of the secondary winding over the entire transformer core, and owing to the uniformity of shape of its individual links.

I claim:—

1. In a measuring transformer of the character described the combination of a closed chain of individual short cores suitably linked together to form a continuous magnetic path, completely surrounding the primary conductor, a secondary winding distributed over each core and electrical connection between all of said core windings, constituting a substantially uniformly distributed secondary winding on said chain.

2. In a measuring transformer of the character described the combination of a closed chain of individual uniformly shaped short cores suitably linked together to form a continuous magnetic path, completely surrounding the primary conductor, a secondary winding distributed over each core and electrical connection between all of said core windings, constituting a substantially uniformly distributed secondary winding on said chain.

In testimony whereof I affix my signature.

GEORG KEINATH.